(12) United States Patent
Li et al.

(10) Patent No.: US 9,894,933 B2
(45) Date of Patent: Feb. 20, 2018

(54) BATTERY ASSEMBLY AND ELECTRONIC CIGARETTE HAVING SAME

(71) Applicant: Shenzhen First Union Technology Co., Ltd., Shenzhen, Guangdong Province (CN)

(72) Inventors: Yonghai Li, Shenzhen (CN); Zhongli Xu, Shenzhen (CN); Min Zheng, Shenzhen (CN); Weihe Liu, Shenzhen (CN)

(73) Assignee: SHENZHEN FIRST UNION TECHNOLOGY CO., LTD., Shenzhen, Guangdong Province (CN)

( * ) Notice: Subject to any disclaimer, the term of this patent is extended or adjusted under 35 U.S.C. 154(b) by 556 days.

(21) Appl. No.: 14/597,178

(22) Filed: Jan. 14, 2015

(65) Prior Publication Data

US 2015/0196062 A1    Jul. 16, 2015

(30) Foreign Application Priority Data

Jan. 14, 2014   (CN) ..................... 2014 2 0021294 U

(51) Int. Cl.
| | |
|---|---|
| A24F 13/00 | (2006.01) |
| A24F 47/00 | (2006.01) |
| H01H 3/20 | (2006.01) |
| H01H 19/36 | (2006.01) |
| H01M 2/10 | (2006.01) |
| H01H 19/11 | (2006.01) |

(52) U.S. Cl.
CPC ............. *A24F 47/008* (2013.01); *H01H 3/20* (2013.01); *H01H 19/36* (2013.01); *H01M 2/1022* (2013.01); *H01M 2/1055* (2013.01); *H01H 19/11* (2013.01); *H01M 2220/30* (2013.01)

(58) Field of Classification Search
CPC ...... A24F 47/008; A24F 47/00; A24F 47/002; H01M 2/1022; H01M 2/1055; H01H 19/10; H01H 19/36
USPC ....... 131/329, 328, 270, 271; 200/11 R, 273, 200/336, 564, 565
See application file for complete search history.

(56) References Cited

U.S. PATENT DOCUMENTS

| | | | | |
|---|---|---|---|---|
| 9,282,772 | B2* | 3/2016 | Tucker | .................. H01C 17/00 |
| 2014/0007891 | A1* | 1/2014 | Liu | ....................... A24F 47/002 |
| | | | | 131/329 |
| 2014/0261500 | A1* | 9/2014 | Park | ...................... A24F 47/008 |
| | | | | 131/329 |
| 2014/0366895 | A1* | 12/2014 | Li | ...................... H01M 2/1055 |
| | | | | 131/329 |

(Continued)

Primary Examiner — Hae Moon Hyeon
(74) Attorney, Agent, or Firm — Cheng-Ju Chiang

(57) ABSTRACT

An exemplary battery assembly for an electronic cigarette includes a housing, a battery received in the housing, and a first switch assembly connected to the battery. The first switch assembly includes a fixed electrode, and a rotatable electrode. The fixed electrode is connected to the battery. The fixed electrode has a conductive area and an insulated area. The rotatable electrode is rotatable between a first position and a second position. In the first position, the rotatable electrode is in contact with the conductive area, thus connecting to the fixed electrode, and the first switch assembly is turned on. In the second position, the rotatable electrode is positioned in the insulated area, thus disconnecting from the fixed electrode, and the first switch assembly is turned off.

19 Claims, 6 Drawing Sheets

(56) References Cited

U.S. PATENT DOCUMENTS

| | | | | |
|---|---|---|---|---|
| 2015/0173421 A1* | 6/2015 | Hsieh | ................... | A24F 47/008 |
| | | | | 131/329 |
| 2015/0181944 A1* | 7/2015 | Li | ..................... | A24F 47/008 |
| | | | | 131/329 |
| 2015/0327597 A1* | 11/2015 | Li | ..................... | A24F 47/008 |
| | | | | 131/329 |
| 2016/0192707 A1* | 7/2016 | Li | ........................ | H05B 3/00 |
| | | | | 131/329 |
| 2016/0302487 A1* | 10/2016 | Chen | ..................... | A24F 47/00 |

\* cited by examiner

BATTERY ASSEMBLY AND ELECTRONIC CIGARETTE HAVING SAME

TECHNICAL FIELD

The present invention relates to electronic cigarettes, and particularly to a battery assembly and an electronic cigarette using same.

BACKGROUND ART

A typical electronic cigarette includes an atomizer and a battery assembly. Generally, the battery assembly includes a push switch. When the push switch is pressed, the electronic cigarette is turned on. However, the push switch may be pressed by mistake. In this case, the electronic cigarette will start working, consuming power in the battery assembly, and causing unnecessary trouble.

What is needed, therefore, is a battery assembly and an electronic cigarette using same, which can overcome the above shortcomings.

SUMMARY

An exemplary battery assembly for an electronic cigarette includes a housing, a battery received in the housing, and a first switch assembly connected to the battery. The first switch assembly includes a fixed electrode, and a rotatable electrode. The fixed electrode is connected to the battery. The fixed electrode has a conductive area and an insulated area. The rotatable electrode is rotatable between a first position and a second position. In the first position, the rotatable electrode is in contact with the conductive area, thus connecting to the fixed electrode, and the first switch assembly is turned on. In the second position, the rotatable electrode is positioned in the insulated area, thus disconnecting from the fixed electrode, and the first switch assembly is turned off.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
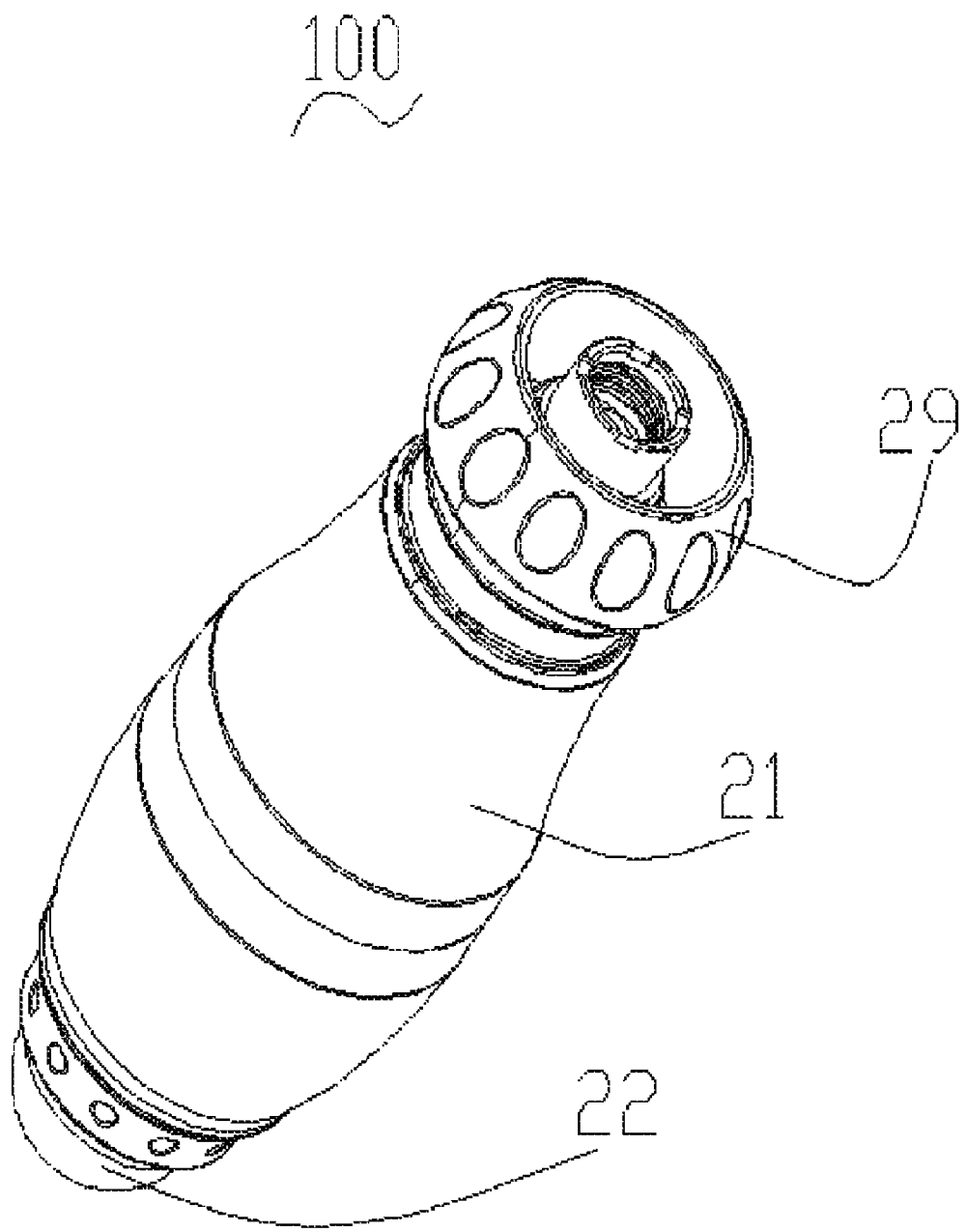
FIG. 1 is a perspective view of a battery assembly for an electronic cigarette according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Several definitions that apply throughout this disclosure will now be presented.

The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
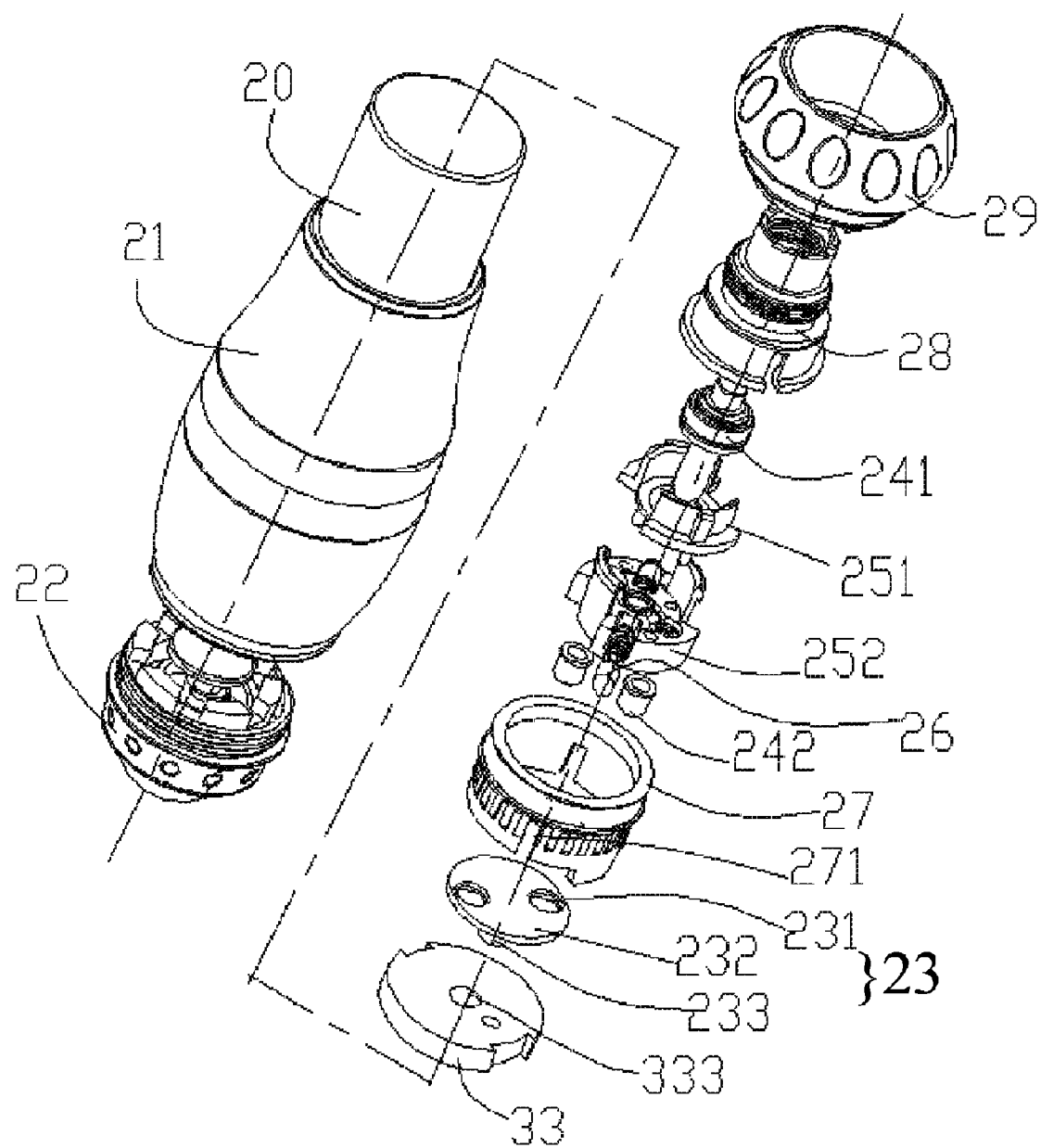
FIG. 2 is an exploded perspective view of the battery assembly of FIG. 1.

Referring to FIG. 1 and FIG. 2, a battery assembly 100 for an electronic cigarette includes a housing 21, a battery 20 arranged in the housing 21, and a first switch assembly partially arranged in the housing 21 to be installed at an end of the housing 21. The first switch assembly includes a fixed electrode 23, a rotatable electrode, an insulated ring 33, a first holder 251, a second holder 252, an engaging rod 26, a clip ring 27, a threaded sleeve assembly 28, and a rotatable sleeve 29. The rotatable electrode includes a first electrode 241 and two second electrodes 242.

The fixed electrode 23 includes an electrically insulated area 231, an electrically conductive area 232, and a contact pin 233. In the present embodiment, the insulated area 231 includes two through holes, each of which is larger than two second electrodes 242 in dimension; the conductive area 232 is a solid area.

The insulated ring 33 defines a through hole 333. The insulated area 231 and the conductive area 232 are positioned above the insulated ring 33, and the contact pin 233 passes through the through hole 333 to electrically connect with the battery.

Figure 3:
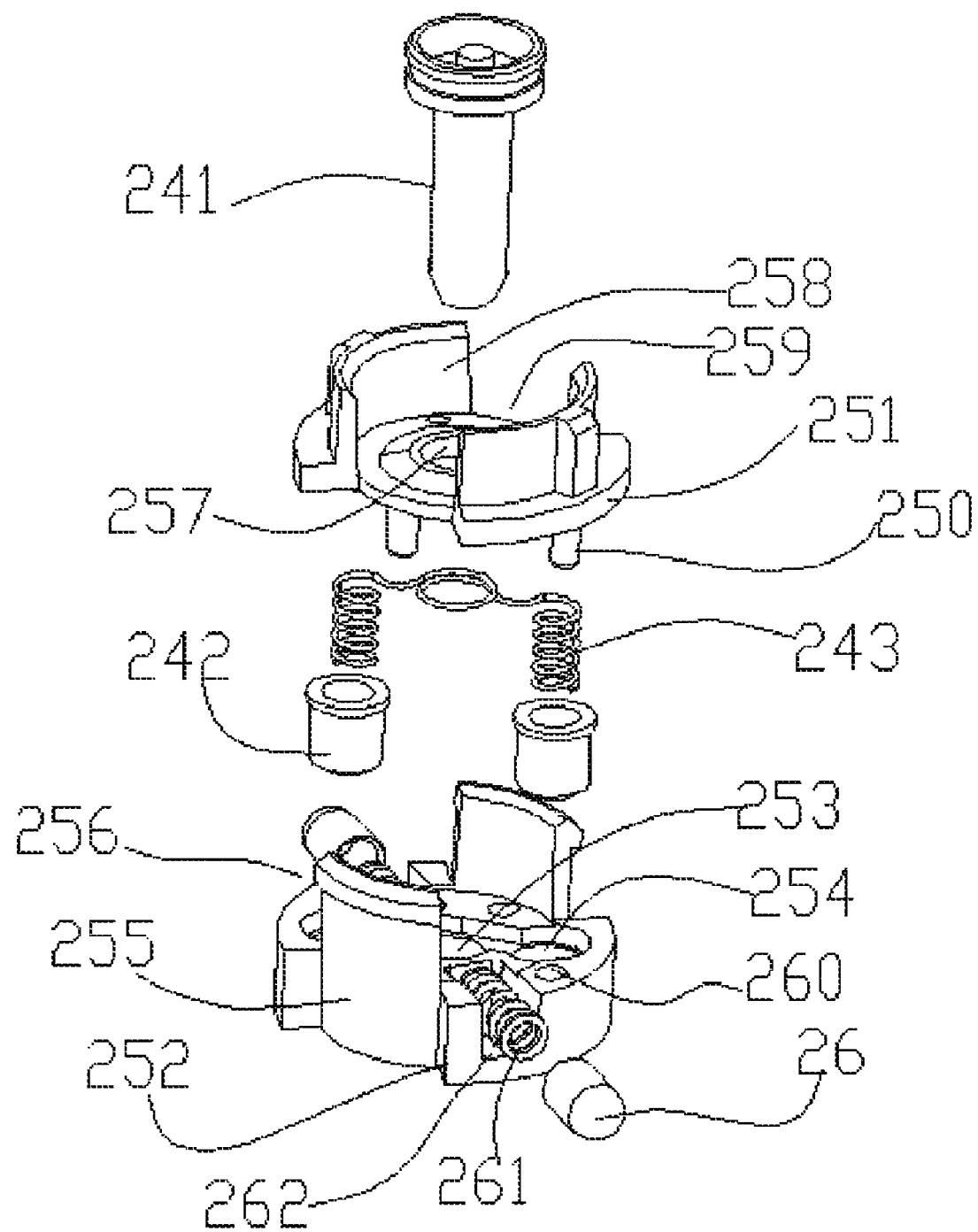
FIG. 3 is an exploded perspective view of a rotatable electrode, a first holder, and a second holder.

Referring to FIG. 3, the first holder 251 includes a first central through hole 257 and a plurality of locating rods 250. The second holder 252 includes a second central hole 253, two electrode holes 254 and a plurality of locating holes 260. The first holder 251 further includes two spaced sidewalls 258 and two gaps 259. The second holder 252 further includes two spaced sidewalls 255 and two gaps 256.

The first electrode 241 goes through the first central through hole 257, and is located in the second central through hole 253. An end of the first electrode 241 is connected to an insulated sheet 240 positioned in the second through hole 253. The two second electrodes 242 are fixed at two ends of a conductive elastic element 243, and received in the two electrode holes 254. The two second electrodes 242 protrude from the two electrode holes 254. The conductive elastic element 243 is connected to the first electrode 241, and the two second electrodes 242 are electrically connected with the first electrode 241 via the conductive elastic element 243. The locating rods 250 insert into the locating holes 260 in one-to-one relationship, so that the first holder 251 is positioned above the second holder 252, and presses the conductive elastic element 243. The first holder 251 is assembled with the second holder 252 in such a manner that the two sidewalls 258 are corresponding to the two gaps 256, and the two sidewalls 255 are corresponding to the two gaps 259.

Further, the second holder 252 defines two locating slots 262 radially extending to a side surface thereof. Two elastic elements 261 are engaged in the two locating slots 262. Two engaging rods 26 hold against the two elastic elements 261, and protrude from the side surface of the second holder 252.

Figure 4:
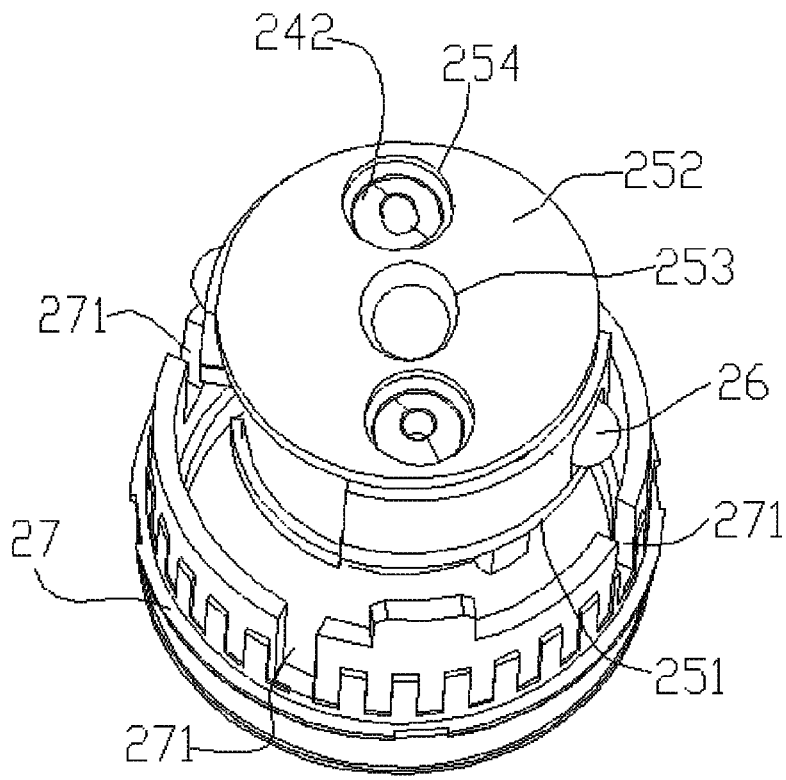
FIG. 4 is an inverted assembled perspective view of the rotatable electrode, the first and the second holders of FIG. 3, and a clip ring.

Also referring to FIG. 4, a clip ring 27 is provided on an external wall of the second holder 252. The clip ring 27 defines four engaging slots 271. The clip ring 27 is fixed at one end of the housing 21. The two engaging rods 26 are coupled with the two elastic elements 261, and thus are movable along the locating slots 262 so as to insert into the engaging slots 271 or disengage from the engaging slots 271.

In the present embodiment, the threaded sleeve assembly 28 includes an external screw sleeve and an internal screw sleeve, and an end of the external screw sleeve is fixedly coupled with the first holder 251. The threaded sleeve assembly 28 is accommodated in an internal space 291 of the rotatable sleeve 29. An internal wall of the rotatable sleeve 29 is fixedly engaged with an external wall of the threaded sleeve assembly 28 so that the rotatable sleeve 29 drives the threaded sleeve assembly 28 to rotate when the rotatable sleeve 29 is rotated.

Figure 5:
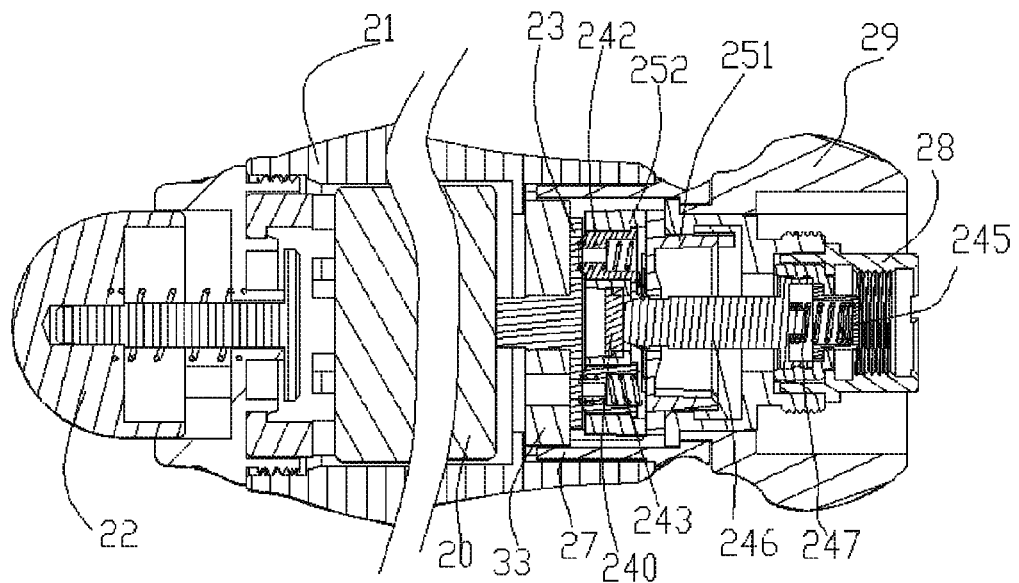
FIG. 5 is a cross-sectional view of the battery assembly of FIG. 1 in a first state.
Figure 6:
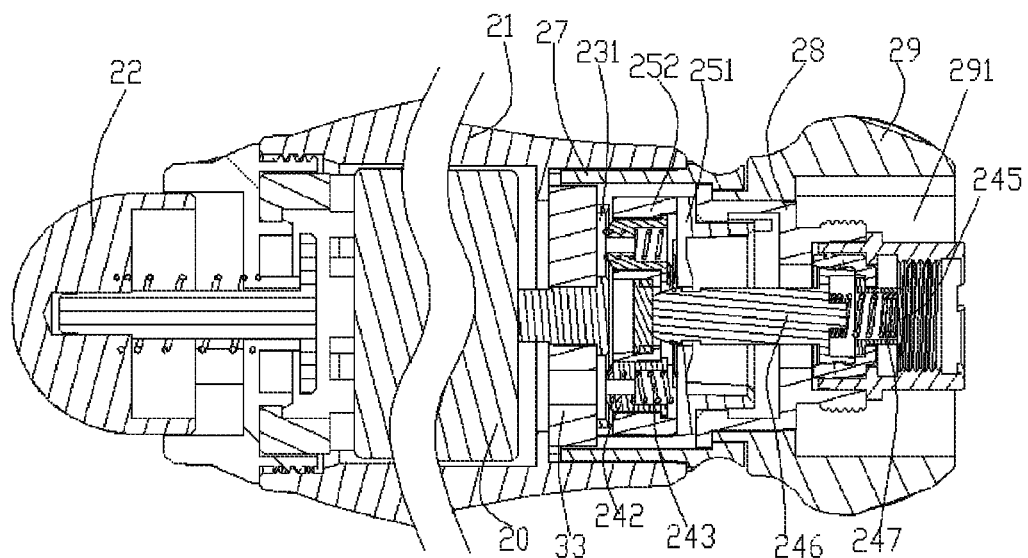
FIG. 6 is a cross-sectional view of the battery assembly of FIG. 1 in a second state.

Referring to FIGS. 5-6, when the rotatable sleeve 29 is rotated, the rotatable sleeve 29 drives the threaded sleeve assembly 28 to rotate, the threaded sleeve assembly 28 drives the first holder 251, the second holder 252, the first electrode 241, the second electrode 242, the engaging rods 26 to rotate. When the two engaging rods 26 insert in the two engaging slots 271, the two second electrodes 242 are rotated to a first position (as seen in FIG. 5), where the two second electrodes 242 are in contact with the conductive area 232 of the fixed electrode 23. In this position, the rotatable electrode is electrically connected to the fixed electrode 23, and the first switch assembly is turned on. When the rotatable sleeve 29 is continued to rotate, the two engaging rods 26 insert in the other two engaging slots 271, the two second electrodes 242 are rotated to a second position (as seen in FIG. 6), where the two second electrodes 242 are located in the insulated areas 231 of the fixed electrode 23. In this position, the rotatable electrode is disconnected from the fixed electrode 23, and the first switch assembly is turned off.

In the present embodiment, four engaging slots 271 of a clip ring 27 are distributed along two diameters of a clip ring 27. Accordingly, the state of the first switch assembly is changed when the rotatable sleeve 29 is rotated every 90 degrees. The first electrode 241 is an elastic pin electrode, which includes a fixed part 246, a movable part 245, and an elastic component 247 arranged between the fixed part 246 and the movable part 245. The movable part 245 is movable along an axial direction thereof upon an external force. Accordingly, a length of the first electrode 241 can be adjusted.

It is to be understood that the total number of the engaging rods 26 is not limited to two. For example, the total number of the engaging rods 26 may be only one, and the engaging rod 26 may extend through a locating slot 262. The total number of the engaging slots 271 is not limited to four. In addition, the first holder 251 and the second holder 252 may be integrally formed. Before molding, the conductive elastic element 243 and the elastic elements 261 are embedded, and the second electrode 242 and the engaging rods 26 are respectively connected to the conductive elastic element 243 and the elastic elements 261.

In other embodiments, the total number of the second electrodes may be only one, and the second electrode 242 and the first electrode 241 may be integrally formed.

The electronic cigarette is turned on or off by rotating the first switch assembly, preventing the electronic cigarette from turning on when pressed by mistake. In the present embodiment, the battery assembly further includes a push switch 22 arranged at an end of the housing 21, and the first switch assembly serves as a safety switch or a locking switch. The push switch 22, as a second switch assembly, includes an internal elastic member. After the first switch assembly is turned on, the second switch further controls the battery assembly to turn on or off. When the second switch is pressed, the battery assembly is turned on; when the second switch is not pressed, the second switch restores to its natural state, and the battery assembly is turned off.

Figure 7:
FIG. 7 is a perspective view of a fixed electrode according to a second embodiment.
Figure 7:
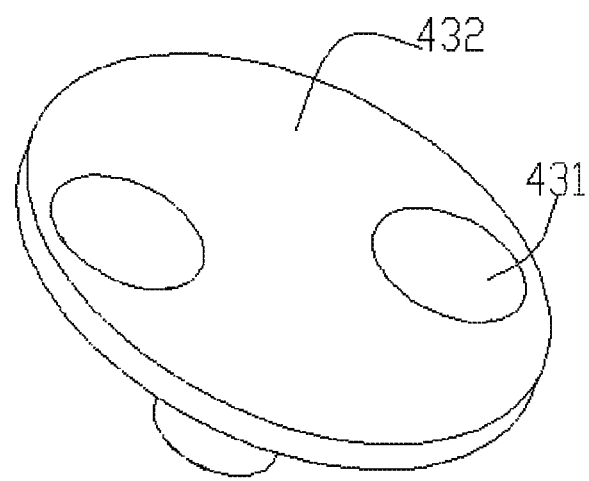

Referring to FIG. 7, a fixed electrode 43 according to a second embodiment is shown. The fixed electrode 43 includes an insulated area 431 made of insulated material and a conductive area 432 made of conductive material. It is noteworthy that positions of the insulated area 431 and the conductive area 432 may be interchanged.

Figure 8:
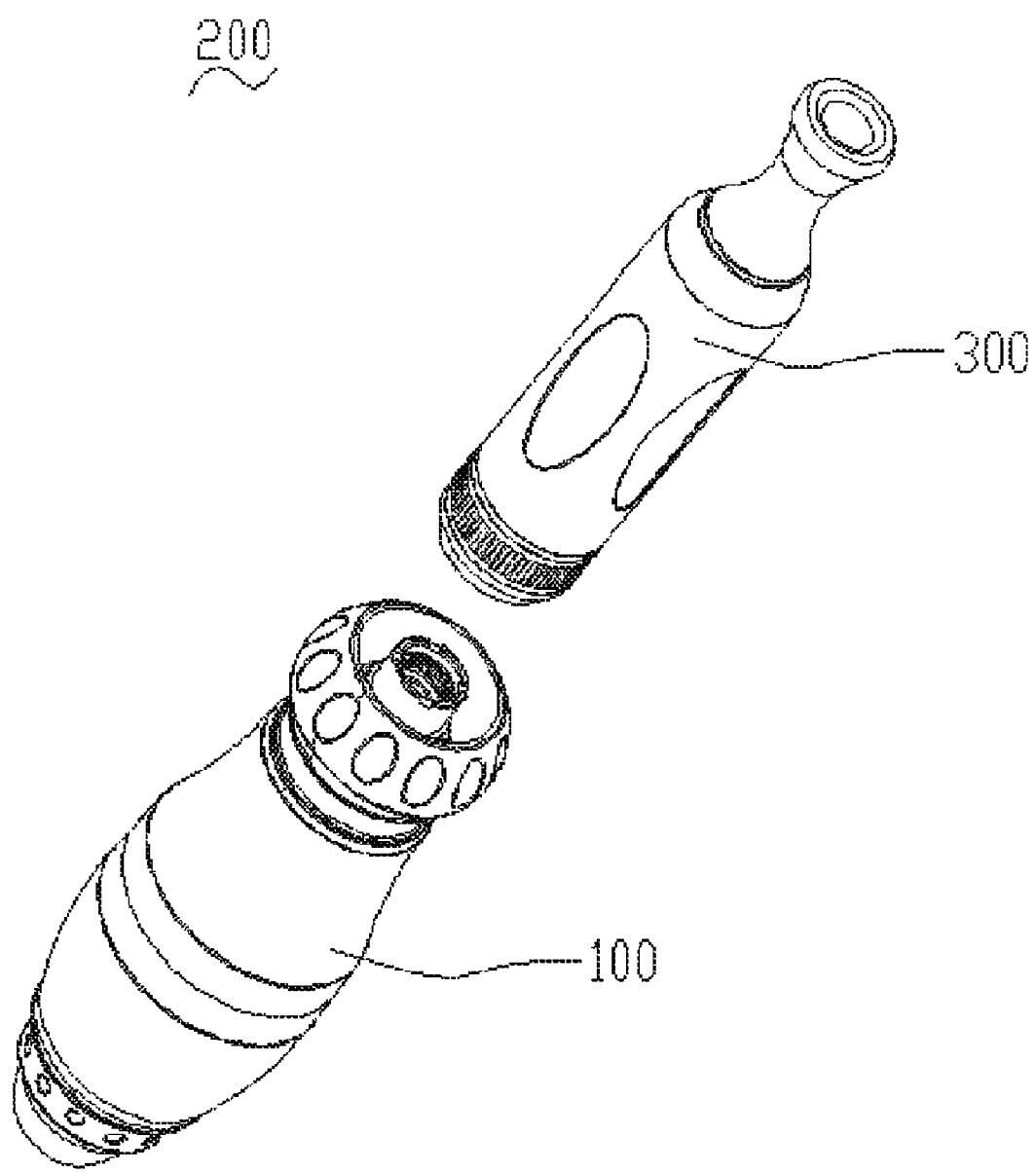
FIG. 8 is a perspective view of an electronic cigarette according to a third embodiment.

Referring to FIG. 8, an electronic cigarette 200 includes the above-mentioned battery assembly 100 and an atomizer 300. The battery assembly 100 is configured (i.e., structured and arranged) for powering the atomizer 300. The atomizer 300 inserts into the battery assembly 100, and is threadedly coupled to the threaded sleeve assembly of the battery assembly 100. The atomizer 300 includes an electrode (not shown) for connecting with the first electrode 241. Because the length of the first electrode 241 can be adjusted along the axial direction, the battery assembly 100 fits the atomizer 300 with the electrode of different depths. After the battery assembly 100 is connected with the atomizer 300, the first switch assembly can be switched to the on or off state by rotating the rotatable sleeve 29. When the first switch assembly is turned on, a user of the electronic cigarette 200 can press the second switch assembly 22 to smoke. When the user does not smoke, the first switch assembly is turned off, and the electronic cigarette 200 will not work even if the second switch assembly 22 were pressed by mistake.

It is to be understood that the atomizer 300 and the battery assembly 100 may be integrally formed.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A battery assembly for an electronic cigarette, comprising:
    a housing;

a battery received in the housing; and
a first switch assembly connected to the battery and partially received in the housing to be installed at an end of the housing, the first switch assembly comprising:
a fixed electrode connected to the battery, the fixed electrode having a conductive area and an insulated area; and
a rotatable electrode being rotatable between a first position and a second position, wherein in the first position, the rotatable electrode is in contact with the conductive area, thus connecting to the fixed electrode, and the first switch assembly is turned on; in the second position, the rotatable electrode is positioned in the insulated area, thus disconnecting from the fixed electrode, and the first switch assembly is turned off.

2. The battery assembly of claim 1, further comprising a second switch assembly, wherein the second switch assembly is connected to the battery, and is configured for turning on or off the battery assembly after the first switch assembly is turned on.

3. The battery assembly of claim 1, wherein the first switch assembly further comprises an insulated ring, the fixed electrode is arranged on the insulated ring, and passes through the insulated ring to connect to the battery.

4. The battery assembly of claim 1, wherein the rotatable electrode comprises a first electrode, two second electrodes, and a first conductive elastic element, the first electrode is insulated from the fixed electrode, and the two second electrodes are connected to the first electrode via the first conductive elastic element.

5. The battery assembly of claim 4, wherein the first electrode comprises a fixed part, a movable part, and a second conductive elastic element arranged between the fixed part and the movable part, the fixed part is connected with the first conductive elastic element, and the movable part is movable along an axial direction thereof upon a force exerted by the second conductive elastic element.

6. The battery assembly of claim 4, wherein the first switch assembly further comprises a holder for supporting the first electrode and the two second electrodes, and the holder drives the first and the second electrodes to rotate relative to the fixed electrode.

7. The battery assembly of claim 6, wherein the holder comprises a first holder and a second holder, the first holder comprises a first central through hole and a plurality of locating rods, the second holder defines a second central hole, two electrode holes, and a plurality of locating holes, the first electrode passes through the first central through hole, and is located in the second central through hole, the two second electrodes are received in the two electrode holes, and protrude from the two electrode holes, the first conductive elastic element is clamped between the first and the second holders, and each locating rod inserts into a respective locating hole.

8. The battery assembly of claim 7, wherein the first switch assembly further includes a clip ring, an engaging rod, and an elastic element the clip ring defines a plurality of engaging slots, the second holder defines a locating slot, an elastic element received in the locating slot, the engaging rod is held against the elastic element, and protrudes from the locating slot, and the engaging rod couples with different engaging slots when the second holder is in the first and the second positions.

9. The battery assembly of claim 6, wherein the first switch assembly further includes a threaded sleeve assembly, the threaded sleeve assembly is fixedly connected with the first electrode and the holder, and the threaded sleeve assembly is configured for driving the first electrode, the holder, and the two second electrodes to rotate.

10. The battery assembly of claim 9, wherein the first switch assembly further comprises a rotatable sleeve fixedly connected to the threaded sleeve assembly, and the rotatable sleeve is adapted for driving the threaded sleeve assembly.

11. An electronic cigarette comprising:
an atomizer; and
a battery assembly for the electronic cigarette according to claim 1, the battery assembly being configured for powering the atomizer.

12. The electronic cigarette of claim 11, further comprising a second switch assembly, wherein the second switch assembly is connected to the battery, and is configured for turning on or off the battery assembly after the first switch assembly is turned on.

13. The electronic cigarette of claim 11, wherein the first switch assembly further comprises an insulated ring, the fixed electrode is arranged on the insulated ring, and passes through the insulated ring to connect to the battery.

14. The electronic cigarette of claim 11, wherein the rotatable electrode comprises a first electrode, two second electrodes, and a first conductive elastic element, the first electrode is insulated from the fixed electrode, and the two second electrodes are connected to the first electrode via the first conductive elastic element.

15. The electronic cigarette of claim 14, wherein the first electrode comprises a fixed part, a movable part, and a second conductive elastic element arranged between the fixed part and the movable part, the fixed part is connected with the first conductive elastic element, and the movable part is movable along an axial direction thereof upon a force exerted by the second conductive elastic element.

16. The electronic cigarette of claim 14, wherein the first switch assembly further comprises a holder for supporting the first electrode and the two second electrodes, and the holder drives the first and the second electrodes to rotate relative to the fixed electrode.

17. The electronic cigarette of claim 16, wherein the holder comprises a first holder and a second holder, the first holder comprises a first central through hole and a plurality of locating rods, the second holder defines a second central hole, two electrode holes, and a plurality of locating holes, the first electrode passes through the first central through hole, and is located in the second central through hole, the two second electrodes are received in the two electrode holes, and protrude from the two electrode holes, the first conductive elastic element is clamped between the first and the second holders, and each locating rod inserts into a respective locating hole.

18. The electronic cigarette of claim 17, wherein the first switch assembly further includes a clip ring, an engaging rod, and an elastic element the clip ring defines a plurality of engaging slots, the second holder defines a locating slot, an elastic element received in the locating slot, the engaging rod is held against the elastic element, and protrudes from the locating slot, and the engaging rod couples with different engaging slots when the second holder is in the first and the second positions.

19. The electronic cigarette of claim 16, wherein the first switch assembly further includes a threaded sleeve assembly, the threaded sleeve assembly is fixedly connected with the first electrode and the holder, and the threaded sleeve assembly is configured for driving the first electrode, the holder, and the two second electrodes to rotate.

* * * * *